US011125578B2

(12) United States Patent
Kilaru et al.

(10) Patent No.: US 11,125,578 B2
(45) Date of Patent: Sep. 21, 2021

(54) SUBSCRIPTION BASED SMART REFUELING

(71) Applicant: TOYOTA MOTOR NORTH AMERICA, INC., Plano, TX (US)

(72) Inventors: Raja Shekar Kilaru, Plano, TX (US); Joshua Batie, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 331 days.

(21) Appl. No.: 16/255,427

(22) Filed: Jan. 23, 2019

(65) Prior Publication Data
US 2020/0232813 A1 Jul. 23, 2020

(51) Int. Cl.
| G06F 19/00 | (2018.01) |
| G06G 7/70 | (2006.01) |
| G06G 7/76 | (2006.01) |
| G01C 21/36 | (2006.01) |
| G01F 23/00 | (2006.01) |
| G01C 21/34 | (2006.01) |
| G06Q 50/30 | (2012.01) |
| B64C 39/02 | (2006.01) |

(52) U.S. Cl.
CPC ........ *G01C 21/3697* (2013.01); *B64C 39/024* (2013.01); *G01C 21/3469* (2013.01); *G01F 23/0076* (2013.01); *G06Q 50/30* (2013.01); *B64C 2201/128* (2013.01)

(58) Field of Classification Search
CPC ............ G01C 21/3697; G01C 21/3469; B64C 39/024; B64C 2201/123; B64C 2201/128; G01F 23/0076; G06Q 50/30; G06Q 10/06; G06Q 50/06; G06Q 10/04; G06F 17/30

USPC ........................................................ 701/123
See application file for complete search history.

(56) References Cited

U.S. PATENT DOCUMENTS

| 7,899,610 | B2 | 3/2011 | McClellan |
| 9,778,653 | B1 | 10/2017 | Mcclintock et al. |
| 9,909,889 | B2 | 3/2018 | Hall et al. |
| 2014/0032087 | A1 | 1/2014 | Shiri et al. |
| 2016/0091338 | A1 | 3/2016 | Abuelsaad et al. |
| 2017/0193424 | A1* | 7/2017 | Botea ................ G06F 16/24575 |
| 2018/0107219 | A1 | 4/2018 | Harris et al. |

FOREIGN PATENT DOCUMENTS

WO WO 2017/200522 A1 11/2017

OTHER PUBLICATIONS

IP.com Search—Feb. 11, 2021 (Year: 2021).*

(Continued)

*Primary Examiner* — Mahmoud S Ismail
(74) *Attorney, Agent, or Firm* — Oblon, McClelland, Maier & Neustadt, L.L.P.

(57) ABSTRACT

A smart refueling service for vehicles which predicts when a vehicle will need refueling based on vehicle sensors and historical and/or predictive information. When analysis indicates the vehicle has insufficient fuel to reach a destination, and there are no refueling stations along the route, a drone is dispatched to refuel the vehicle. The service is a subscription service which registers and authenticates a vehicle and monitors the vehicle based on user preferences. The user preferences may be to refuel at a desired time of day, day of the week or at a desired location.

20 Claims, 11 Drawing Sheets

(56) References Cited

OTHER PUBLICATIONS

Eric Newcomer, "Gas Delivery Startups Want to Fill Up Your Car Anywhere. Is That Allowed?", Bloomberg, https://www.bloomberg.com/news/articles/2016-05-02/gas-delivery-startups-want-to-fill-up-your-car-anywhere-is-that-allowed, May 1, 2016, 2 pages.

"Toyota Accelerates Its Connected Car Technology Initiatives", Toyota USA Newsroom, https://pressroom.toyota.com/releases/toyota+connected+car+technology+accelerates.htm, Jan. 4, 2016, 2 pages.

Shigeki Tomoyama, "Toyota's Connected Strategy Briefing", Toyota Motor Corporation, Nov. 1, 2016, 28 pages.

* cited by examiner

SUBSCRIPTION BASED SMART REFUELING

BACKGROUND

Technical Field

The present disclosure is directed to a subscription based smart refueling service for vehicles which predicts when a vehicle will need refueling based on vehicle sensors and historical and/or predictive information. When analysis indicates the vehicle has insufficient fuel to reach a destination, and there are no refueling stations along the route, a refueling vehicle (e.g., a truck or a drone) is dispatched to refuel the vehicle.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Vehicle refueling subscription services are becoming more prevalent as people look for convenience and spend more time on the road in their vehicles. A refueling service delivers fuel directly to a vehicle based on a customer request. Current refueling services deliver gasoline in refueling trucks to the location or a future location of a vehicle. Some vehicle refueling services are Filld, WeFuel, Yoshi, Purple and Booster Fuels (See Newcomer, E., "Gas Delivery Startups Want to Fill Up Your Car Anywhere. Is That Allowed?", 2016. Bloomberg. https://www.bloomberg.com/news/articles/2016-05-02/gas-delivery-startups-want-to-fill-up-your-car-anywhere-is-that-allowed.)

An example of an autonomous drone truck for refueling can be found in commonly owned publication U.S. 2018/0107219 A1, incorporated herein by reference in its entirety.

It is the object of the present disclosure to provide a smart refueling service with predictive monitoring of fuel needs based on data from vehicle electronic control units (ECU), vehicle sensors (DTC), controller area network (CAN) data and historical and/or predictive information to determine when a drone should be dispatched to refuel the vehicle.

SUMMARY

Embodiments to a subscription based smart refueling service, method for a subscription based smart refueling service and a non-transitory computer readable medium having instructions stored therein that, when executed by one or more processors, causes the one or more processors to perform a method for a subscription based smart refueling service are described. The smart refueling service may be subscription-based or may be demand-based. The service may incorporate historical and/or predictive information with vehicle diagnostics to determine when and where to refuel a vehicle.

In an embodiment, historical and/or predictive information may include information regarding a driver score of a vehicle driver, historical data of similar vehicle types, data sourced from vehicles currently travelling on the same route as the vehicle, environmental information, such as weather or predicted weather along the route, GPS route information, etc.

In another embodiment, vehicle sensor data may include tire pressure, tire wear, engine temperature, CAN data, diagnostic trouble codes, accelerometer data, road imaging data, speed sensors, fuel gauge readings, spark knock sensors, etc.

In some embodiments, the service may correlate the historical and/or predictive information with the vehicle sensor data to correct the fuel mileage and use predictive modelling to determine a time when the vehicle needs refueling partially based on the corrected fuel mileage.

In some embodiments, information for predicting low fuel levels in a vehicle may be generated, at least in part, using historical and/or predictive information. The information can be gathered using various big data sources and/or vehicle sensors, such as the gas tank sensing unit. Historical and/or predictive information can identify driving trends of one or more vehicles. Predictive modeling can be used to correlate these driving trends to measured fuel levels. The driving trends can indicate certain driving behaviors that may be deemed to affect the vehicle's consumption of fuel, such as driving on poor road conditions, driving with low/flat tire, and remaining distance to destination. For instance, a predictive algorithm can be applied to determine that driving with a tire under a certain PSI will reduce the fuel level at a faster rate, and further predict (based on an identified low PSI for the vehicle) when the vehicle will run out of fuel. In some aspects, the present disclosure provides additional smart fueling features such as using predictions of optimized refueling times. In some aspects, once a trigger condition is met for refueling, a drone can be sent to the car to immediately refuel.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
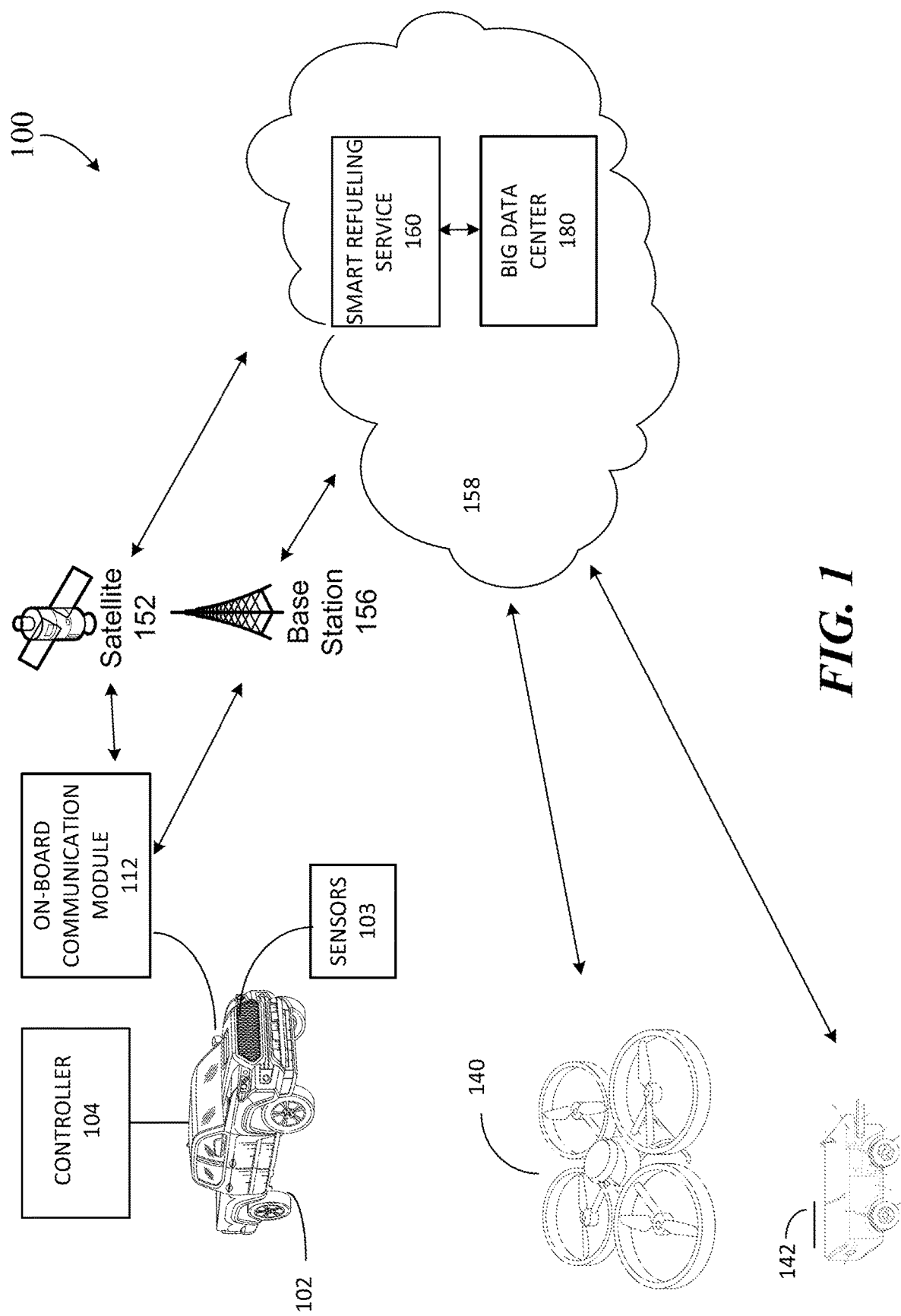
FIG. 1 is a schematic diagram of a smart refueling environment, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a smart refueling service, method for refueling a vehicle and non-transitory computer readable medium having instructions stored therein that, when executed by one or more processors, causes the one or more processors to perform a method for providing a smart refueling service.

Aspects of this disclosure may use big data sources to obtain current and historical and/or predictive information used to perform smart refueling. Data analytics of the historical and/or predictive information, vehicle sensor data, and GPS information are used to predict a refueling need. If a trigger condition is met for refueling, a drone carrying fuel is sent to the vehicle.

Big data is a compilation of data sources, including vehicle manufacturing statistics, vehicle testing statistics, reported vehicle failures, vehicle accident reports, service information gathered by service centers, tire manufacturer historical information, road statistics, and the like.

Big data relating to the manufacturing of vehicles can be gathered using big data sources (e.g., assembly line sensors, car line sensors, parts manufacturing data, insurance statistics, traffic control centers, etc.) and/or vehicle sensors/subsystems. In some cases, data can be gathered during manufacturing and post-manufacture throughout the lifecycle of the vehicles.

Additionally, big data can include road condition statistics, such as the number of curves, hills, construction on the roadway, accidents, potholes or other road defects. GPS route information, such as distance from one point to another, location of refueling stations, speed limits, environmental information, such as weather or predicted weather along the route, and traffic conditions is included in big data sources.

Big data can include driver information, such as a driver score, historical driving statistics for the driver, such as speeding or swerving, driver violations, driving while intoxicated, etc. Further, big data may include data sourced from other vehicles currently travelling on the same route as the vehicle.

Toyota's big data center collects and analyzes data from vehicles equipped with a Data Communication Module (DCM), using a next-generation connected-vehicle framework, which transmits data over cellular networks. The Toyota Big Data Center (TBDC) in the Toyota Smart Center analyzes and processes data collected by DCM, and uses the data to deploy services under high-level information security and privacy controls. (See "Toyota Accelerates Its Connected Car Technology Initiatives", 2016, https://pressroom.toyota.com/releases/toyota+connected+car+technology+accelerates.htm, and "Toyota's Connected Strategy Briefing", 2016, each incorporated herein by reference in its entirety).

Aspects of the disclosure relate to determining vehicle diagnostic parameters which affect fuel mileage. Fuel mileage as used herein is defined as the distance (miles) a vehicle can travel without running out of fuel. Alternatively, a fuel mileage threshold can be set by a user of the service which defines an amount of fuel the user would prefer not to go below. In a non-limiting example, a driver of a vehicle having a gasoline engine may prefer that the remaining fuel mileage never pass below 30 miles. In this situation, the smart refueling service will consider 30 miles as the lowest threshold of the fuel mileage. The present disclosure is not limited to using miles to calculate or display the fuel mileage. In some instances, fuel mileage may be calculated and displayed in kilometers.

Many vehicles provide a display indicating the fuel mileage left in the vehicle. For example, the display may indicate that the fuel mileage is 120 miles. This fuel mileage may need to be corrected as vehicle parameters, road conditions and driving styles change.

For example, a tire with low pressure may have a smaller diameter than a tire having a proper pressure. The circumference of the tire will be smaller, thus the fuel mileage will be lower. Additionally, the low pressure of the tire may cause drag on the vehicle, which may cause the engine to work harder, lowering the fuel mileage. In another example, road conditions may be wet, causing the tires to spin without adding to the progress of the vehicle, which lowers the fuel mileage.

High opposing winds and inclines cause the engine to work harder to make the same progress along the route, thus lowering the fuel mileage. Conversely, high winds in the direction of the vehicle's progress or downwardly sloping surfaces may increase the fuel mileage.

In a further example, the driving style of a driver may affect the fuel mileage. For example, it is well known that speeding decreases the fuel mileage, as do braking and swerving.

A vehicle controller (e.g., an electronic control unit (ECU)) determines, based on historical and/or predictive information during operation of a vehicle, particular habits, patterns, and/or otherwise behavior of one or more drivers of the vehicle that are indicative of tire wear. For example, a driver who suddenly and/or excessively performs maneuvers of a vehicle such as turning, braking, and/or throttling causes vehicle tire tread to predictably wear and/or degrade. Similarly, a driver who repeatedly causes a vehicle tire to hit objects (e.g., a curb, a sidewalk, a speed bump, road debris, etc.) and/or potholes, drives the vehicle at excessive speeds, drives the vehicle on poor road conditions, and/or drives the vehicle with relatively low or high tire fluid pressure causes the vehicle tire tread to predictably wear and/or degrade. Such behavior of driver(s) is sometimes referred to herein as driver behavior of interest or behavior of interest. The controller also receives historical data from one or more vehicle sensors (e.g., an accelerometer, a wheel speed sensor, a tire pressure sensor, etc.), one or more vehicle systems (e.g., an anti-lock braking system (ABS)), a global positioning system (GPS), etc.), one or more networks (e.g., a vehicle control area network (CAN), the Internet, etc.), etc. The controller then combines this historical data. Vehicle sensor data may include tire pressure, tire wear, engine temperature, CAN data, diagnostic trouble codes, accelerometer data, road imaging data, speed sensors, fuel gauge readings, spark knock sensors, etc.

The smart refueling service of the present disclosure may incorporate historical and/or predictive information with vehicle diagnostics to determine when and where to refuel a vehicle. The service may correlate the historical and/or predictive information with the vehicle sensor data to correct the fuel mileage and use predictive modelling to determine a time when the vehicle needs refueling partially based on the corrected fuel mileage. For instance, a predictive algorithm can be applied to determine that driving with a tire under a certain PSI will reduce the fuel level at a faster rate, and further predict (based on an identified low PSI for the vehicle) when the vehicle will run out of fuel. In some implementations, the innovation provides additional smart fueling features such as using predictions to indicate optimized refueling times (e.g., once a week). In some cases, once a trigger condition is met for refueling, a drone can be sent to the vehicle to immediately refuel it.

Figure 2:
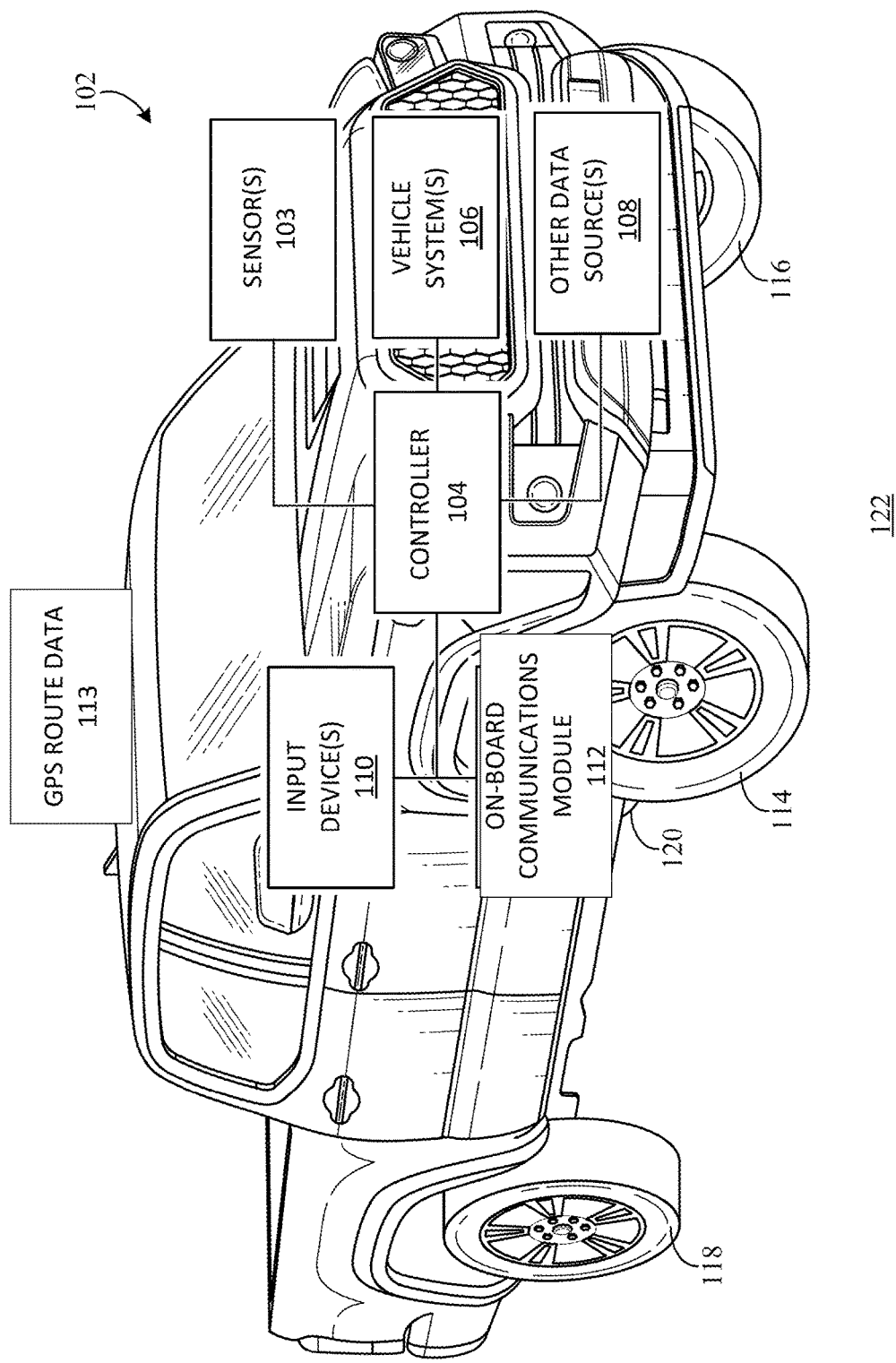
FIG. 2 illustrates a connected vehicle including an on-board communications module, according to certain embodiments.

FIG. 1 and FIG. 2 illustrate embodiments of a subscription based smart refueling service 100 including a vehicle 102 (e.g., a car, a van, a truck, a sport utility vehicle (SUV), etc.) in which examples disclosed herein can be implemented. As shown in FIG. 2, vehicle 102 includes a controller 104, one or more sensors 103, one or more vehicle systems 106, an on-board communication module 112, one or more other data sources 108, such as GPS data or stored historical and/or predictive information data, one or more example input device(s) 110, and one or more tires 114, 116, 118, 120. The tires 114, 116, 118, 120 include sensors which communicate the tire pressure to the controller 104, which includes circuitry for determining a low tire condition. The controller 104 is configured to use the low tire condition with data obtained from the other vehicle sensor(s) 103, the vehicle system(s) 106, and/or the other data source(s) 108, to determine the remaining fuel mileage of the vehicle.

The controller 104 implemented, for example, using one or more ECUs. In particular, the controller 104 is communicatively coupled to the sensor(s) 103, the vehicle system(s) 106, the other data sources 108, and the input device(s) 110 to receive data therefrom, for example, via a transmission or signal wire, a bus (e.g., a vehicle CAN), radio frequency, etc. Further, the controller 104 is communicatively coupled to the on-board communication module 112 to transmit and receive communications to or from the smart refueling service 160.

The sensor(s) 103 of FIG. 1, include one or more accelerometers, one or more gyroscopes, one or more wheel speed sensors, one or more yaw rate sensors, one or more wheel speed sensors, one or more tire pressure sensors, one or more brake pressure sensors, one or more throttle position sensors, one or more cameras, one or more GPS locators, and/or any other appropriate sensor(s) that enable or facilitate functionality for the vehicle 102, improve vehicle performance, and/or improve vehicle safety. In particular, the sensor(s) 103 are operatively coupled to the vehicle 102 and configured to generate, obtain, and/or otherwise provide data associated with the vehicle 102 and/or the driving surface 122. For example, the sensor(s) 103 detect and/or determine one or more rotational wheel parameters (e.g., wheel speed, wheel acceleration, wheel deceleration, etc.) associated with one or more of the tires 114, 116, 118, 120. In another example, the sensor(s) 103 detect and/or determine one or more accelerations (e.g., one or more of a transverse acceleration, a longitudinal acceleration, and/or a vertical acceleration) of the vehicle 102. Conversely, in yet another example, the sensor(s) 103 detect and/or determine a deceleration (e.g., a longitudinal deceleration) of the vehicle 102. In yet another example, the sensor(s) 103 detect and/or determine a brake fluid pressure of the vehicle 102. In yet another example, the sensor(s) 103 detect and/or determine a fluid pressure of one or more of the tires 114, 116, 118, 120, which is sometimes referred to as a tire fluid pressure or simply tire pressure. In yet another example, the sensor(s) 103 detect and/or determine a yaw rate of the vehicle 102, which indicates a swerving or turning action by a driver.

The data from the controller 104 includes the fuel level as measured by a gauge in the fuel tank of the vehicle 102. Controller 104 determines the remaining mileage the vehicle can cover based on the gauge level and transmits the remaining mileage with the sensor data and historical and/or predictive information via the on-board communication module 112 to the smart refueling service 160.

The smart refueling service may be implemented in any one of a cloud computing environment, a web application residing on one or more servers, a website, in a blockchain system and a distributed server system.

Figure 3:
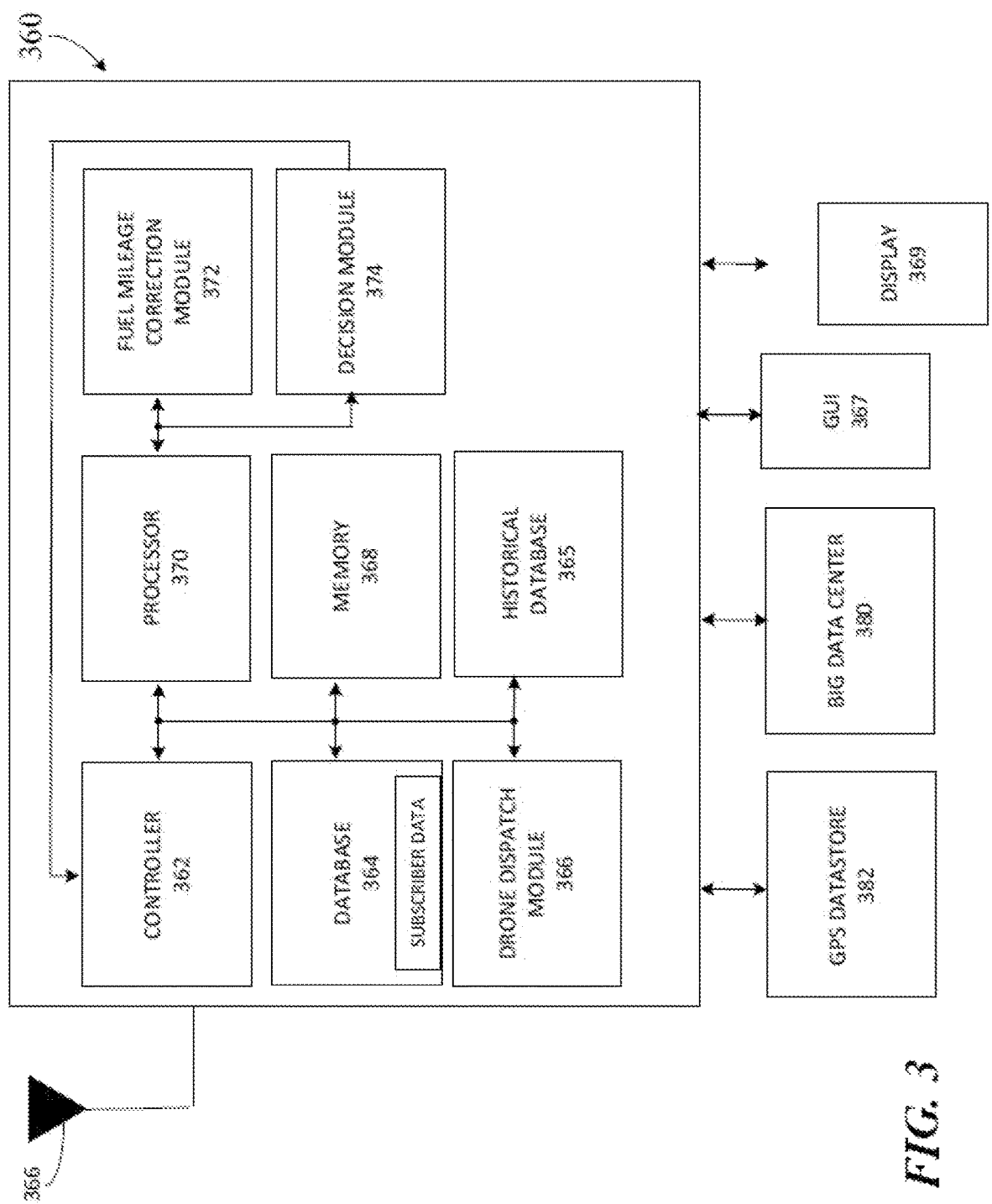
FIG. 3 is an exemplary illustration of a smart refueling service according to certain embodiments.

As shown in FIG. 3, the smart refueling service may include a controller 362, at least one database 364 including subscriber data, at least one historical database 365, at least one transceiver 366, at least one memory 362 including program instructions, a graphical user interface (GUI) 367, a display 369, a processor 370 including analysis circuitry configured to use the program instructions to analyze information received from controller 104 and correlate the information with data received from a Big Data center 380, historical information in historical database 365 and GPS data 382, to determine a corrected fuel capacity and a prediction of the distance the vehicle can travel along the route based on the corrected fuel capacity. The smart refueling service may notify the driver of refueling stations along the route which can be reached before the fuel capacity is exhausted. If there are no refueling stations which the vehicle can reach before exhausting its fuel, the smart refueling service dispatches a drone (140 or 142) to meet the vehicle along the route.

In some aspects, the drone may be a UAV capable of carrying fuel, such as gasoline or electrically stored energy as shown by UAV 140 in FIG. 1.

In some aspects, the drone may be an autonomous refueling truck 142, such as shown in FIG. 1B, could be implemented using the autonomous drone truck for refueling described in commonly owned publication U.S. 2018/0107219 A1.

In some aspects, the drone may be one of a fleet of drones which are controlled by the smart refueling service 160.

The database 364 can represent one or more local and/or external databases and/or memory 368 communicably coupled to smart refueling controller 362. For example, historical database 365 can store various statistical information used to assist in automatically identifying manufacturing defects of vehicles.

The server can represent one or more servers communicably coupled to the on-board communication module 112, the smart refueling service 160 and the drone 140 or 142. For example, the server can include processing circuitry configured to operate the system 100, receive data from the communication module 112, receive statistical information from the database 364 or historical database 365, and the like. The server may include an application server which hosts a web application which performs some or all of the processes of the smart refueling service. The server may include a communication endpoint or find other endpoints and communicate with those endpoints. The server may share computing resources, such as CPU and random-access memory over a network. The server may be a virtual server or a web server. A network 158, which may be a cloud network, enables the communication between the on-board communication module, satellites 152 or base stations 156 and the at least one drone 140 or 142.

The processing circuitry of the smart refueling service 360 residing on the server can carry out instructions to perform or cause performance of various functions, operations, steps or processes of the system 100. The controller 362 and processing circuitry 370 can be configured to store information in memory, operate the system 100, and receive and send information in the form of signal(s) between the sensors 103, the controller 104, the controller 362, and the big data center 380.

The network 158 can represent one or more networks connecting the sensors 103, the controller 104, the controller 362, and the big data center 380, and the server. The network 158 can be a public network, such as the Internet, or a private network such as a local area network (LAN) or a wide area network (WAN) network, or any combination thereof and can also include a public switched telephone network (PSTN) or integrated services for digital network (ISDN) sub-networks. The network 158 can also be wired, such as an Ethernet network or a USB port, or can be wireless such as a cellular network including EDGE, 3G 4G, and LTE/LTE-A wireless cellular systems. The wireless network can also be Wi-Fi, Bluetooth, or any other wireless form of communication that is known.

Information for predicting low fuel levels in a vehicle may be generated, at least in part, using historical and/or predictive information. The information can be sourced from Big Data Center 380 and/or vehicle sensors, such as gas tank sensing units and tire pressure sensors. Historical and/or predictive information can identify driving trends of one or more vehicles. Predictive modeling can correlate these driving trends to measured fuel mileage. The driving trends may indicate certain driving behaviors that may be deemed to affect the vehicle's consumption of fuel, such as driving on poor road conditions, driving with low/flat tire, and remaining distance to destination. A predictive algorithm can be applied to determine that driving with a tire under a certain PSI will reduce the fuel level at a faster rate, and further predict when the vehicle will run out of fuel. In some aspects, the present disclosure provides additional smart refueling features such as using predictions to indicate optimized refueling times. In some aspects, once a trigger condition is met for refueling, a drone can be sent to the car to immediately refuel.

The controller 362 receives data communications from the on-board communication module 112 of the vehicle 102. The controller also receives GPS Data 382, data entered at graphical user interface 367 and data from Big Data Center 380. The controller may send a search query to the Big Data Center for historical and/or predictive information relevant to the type of vehicle 102 or similar types of vehicles and travelling on the same route as vehicle 102. Similar types of vehicles are those of approximately the same weight, body size and engine horsepower as the monitored vehicle. Based on the query, the Big Data Center may return information regarding the fuel mileage of the similar types of vehicles. The Big Data Center may also provide the fuel mileage of vehicles currently travelling on the same route as vehicle 102. The Big Data Center may provide a driver score or driver statistics for a driver of the vehicle 102. For example, young drivers may frequently accelerate/decelerate abruptly, thereby reducing the vehicle's miles per gallon (MPG). Other drivers may drive more conservatively, thus increasing the MPG.

The Big Data Center 380 may provide information about the fuel mileage on the same route as vehicle 102 for types of vehicles of similar type to the vehicle 102.

The data received by the controller 362 is sent to the processor 370 for analysis. Processor 370 includes circuitry which uses the program instructions stored in memory 368 to analyze the data. The processor sends the data to the Fuel Mileage Correction Module 372 to correlate the measured fuel mileage (from controller 104) with the driver score, environmental information, historical data, GPS data and data from the Big Data Center and predict a corrected fuel mileage.

The processor determines whether the vehicle can reach a refueling location using the corrected fuel mileage in Decision Module 374. If the vehicle is able to reach a refueling location, controller 362 transmits a message to controller 104 to notify the driver of the need to refuel and the refueling location. If the vehicle is not able to reach a refueling location, the controller 362 instructs the Drone Dispatch Module 366 to dispatch a drone to meet the vehicle along the route.

The vehicle 102 may be instructed to stop at a rendezvous point determined by the Drone Dispatch Module 366. Alternatively, the drone may rendezvous with the moving vehicle at a docking station on the vehicle roof, as is described in U.S. Pat. No. 9,778,653 B1, incorporated herein by reference in its entirety.

The first exemplary embodiment of a subscription based smart refueling service is shown in FIG. 1-3.

The subscription based smart refueling service includes a receiver 366; a controller 362 operatively connected to the receiver; a processor 370 operatively connected to the controller; a fuel mileage correction module 372 operatively connected to the processor. The service further includes at least one first database 364 including subscriber data; at least one second database 365 including historical data; at least one memory 368 storing programming instructions for performing the smart refueling service; a decision module 374 having an input and an output, the decision module operatively connected to the processor 370 at its input and operatively connected to the controller 362 at its output.

A drone dispatch module 366 is operatively connected to the controller to dispatch at least one drone (140, 142) based on a decision that a vehicle requires refueling.

The controller includes circuitry configured to receive an identification from a vehicle having an on-board communication module 112, compare the identification to subscriber data stored in the first database 364 and authenticate the vehicle based on the comparison.

The controller further receives sensor 103 data from the vehicle, wherein the sensor data includes at least tire pressure data, road condition data and fuel mileage data; receives a driving route from the vehicle, the route including at least a destination and a current location; receives data from a big data center 380, wherein the data is at least historical data related to operating parameters of similar types of vehicles and driving trends of the driver of the vehicle, and receives GPS data 382 related to the route.

The processor includes circuitry configured to correlate the sensor data, historical data, driving trends of the driver and GPS data related to the route to correct the fuel mileage, and to compare the corrected fuel mileage with the distance to the destination and the distance to a refueling station.

The decision module 374 includes program instructions configured to predict whether the vehicle has sufficient fuel to reach the refueling station based on the corrected fuel level; and when the vehicle does not have sufficient fuel to reach the refueling station, sends a signal to the controller to dispatch a drone (140 or 142) to refuel the vehicle 102.

The drone may be an unmanned aerial vehicle 140 equipped for transporting fuel, and may optionally be equipped for docking with a docking station (not shown) on the vehicle. The drone may transfer the fuel while the vehicle is driving along the route. The drone may identify and communicate with the driver to deliver the fuel, drop the fuel at a specified location or optionally transfer the fuel autonomously when the vehicle and the drone are equipped with docking equipment.

The drone may be an unmanned ground vehicle 142 equipped for transporting fuel and refueling a vehicle.

The identification of the vehicle may include the identity of a driver (not shown) of the vehicle; wherein the driving trends associated with the driver include a driver score of the identified driver. The controller receives data from the big data center relating fuel consumption to driver scores and determines a corrected fuel consumption of the vehicle based on the driver score of the identified driver; compares the corrected fuel consumption to a fuel mileage of the vehicle and a distance between the vehicle and a vehicle destination; and generates, via an output device (such as transceiver 366), a refueling notification for the identified driver based on the comparison. The driving score of the driver is partially based on historical sensor data recording vehicle braking events, vehicle throttling events and abrupt turning events which occurred when the identified driver operated the vehicle.

The tire pressure data may indicate that a fluid pressure of a tire is relatively low or high as compared to a desired pressure. The operating parameters of similar types of vehicles correlate fluid pressure to fuel mileage. The processor has programming instructions to compare the fluid pressure of the tire to a threshold fluid pressure as indicated by the operating parameters of similar types of vehicles; and to calculate a reduction in the fuel mileage of the vehicle based on the comparison.

GPS data is sourced to identify when a portion of the route includes an inclined driving surface. The processor has programming instructions to determine a slope and a length of the inclined driving surface, the slope corresponding to a decrease in the fuel consumption of the vehicle; and calculate, via the fuel mileage correction module 372, a corrected fuel consumption based on the slope and the length of the driving surface.

Figure 4:
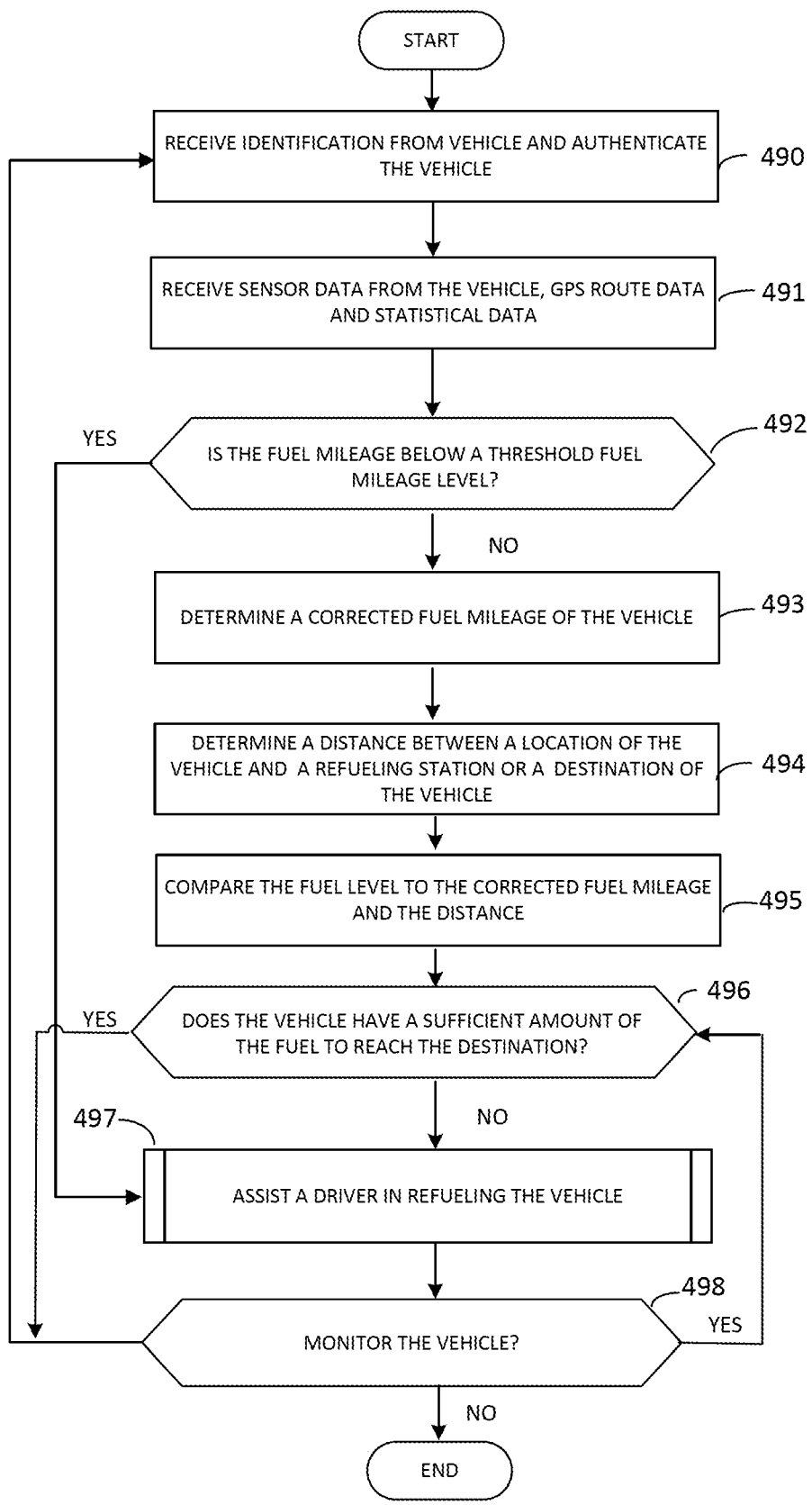
FIG. 4 is an exemplary flowchart of determining a corrected fuel mileage, according to certain embodiments.

FIG. 1-3 and the flowchart of FIG. 4 illustrate a method for refueling a first vehicle by a subscription based smart refueling service 100, comprising receiving an identification from a vehicle 102 and comparing the identification to subscriber data in database 364 to authenticate the vehicle based on the comparison (490); receiving vehicle sensor data (491) from sensors 103 within the first vehicle 102, the sensors including tire pressure sensors, road condition sensors and fuel level sensors; receiving first GPS route data 113 from the first vehicle, the route including at least a destination and a current location; receiving statistical data from a big data center 380, wherein the data is at least historical data related to operating parameters of similar types of vehicles on the route and driving trends of the driver of the vehicle; receiving second GPS data from a GPS Datastore 382 related to the route; combining the vehicle sensor data, the route information and the statistical data; correlating, using predictive modelling, the vehicle sensor data, the route information and the statistical data to a measured fuel mileage of the vehicle. The fuel mileage is corrected (493) based on the correlating. The method continues by determining the distance of the vehicle from a refueling station (494); determining whether the vehicle has sufficient fuel to reach the refueling station based on the corrected mileage level (495); and when the vehicle does not have sufficient fuel (NO) to reach the refueling station, assisting the driver in refueling the vehicle by dispatching a drone to refuel the vehicle (497). The drone may be an unmanned aerial vehicle 140.

The method further includes predicting an optimum refueling time based on the corrected fuel level.

The route information 113 includes a starting location and a starting time, a plurality of intermediate destinations, each intermediate destination including a non-driving time, a final destination and the locations of refueling stations along the route. The processing further includes determining whether the vehicle has sufficient fuel to reach a first intermediate destination or a refueling station; and when the vehicle does not have sufficient fuel to reach the first intermediate destination or a refueling station, dispatching a drone to refuel the vehicle; when the vehicle has sufficient fuel to reach the first intermediate destination, determining whether the vehicle has sufficient fuel to reach the second intermediate destination, if the vehicle does not have sufficient fuel to reach the second intermediate destination, dispatching a drone to refuel the vehicle during the non-driving time.

The controller receives an identification of the driver of the vehicle 102 from the on-board communications module 112. The method includes identifying whether a first a driver or a second driver is operating the vehicle, the first driver associated with a first fuel consumption of the vehicle different from a second fuel consumption associated with the second driver; determining a corrected fuel consumption of the vehicle based on the fuel consumption of the identified driver; comparing the corrected fuel consumption to a fuel mileage of the vehicle and a distance between the vehicle and a vehicle destination; and generating, via an output device, a refueling notification for the identified driver based on the comparison. The notification includes a refueling request associated with a drone, and if the driver accepts the refueling request, transmitting the refueling request to the drone (140 or 142).

The method includes further including determining, based on a location of the vehicle, one or more refueling locations nearby the vehicle or a portion of the route, wherein the refueling notification includes the one or more refueling locations.

Figure 5A:
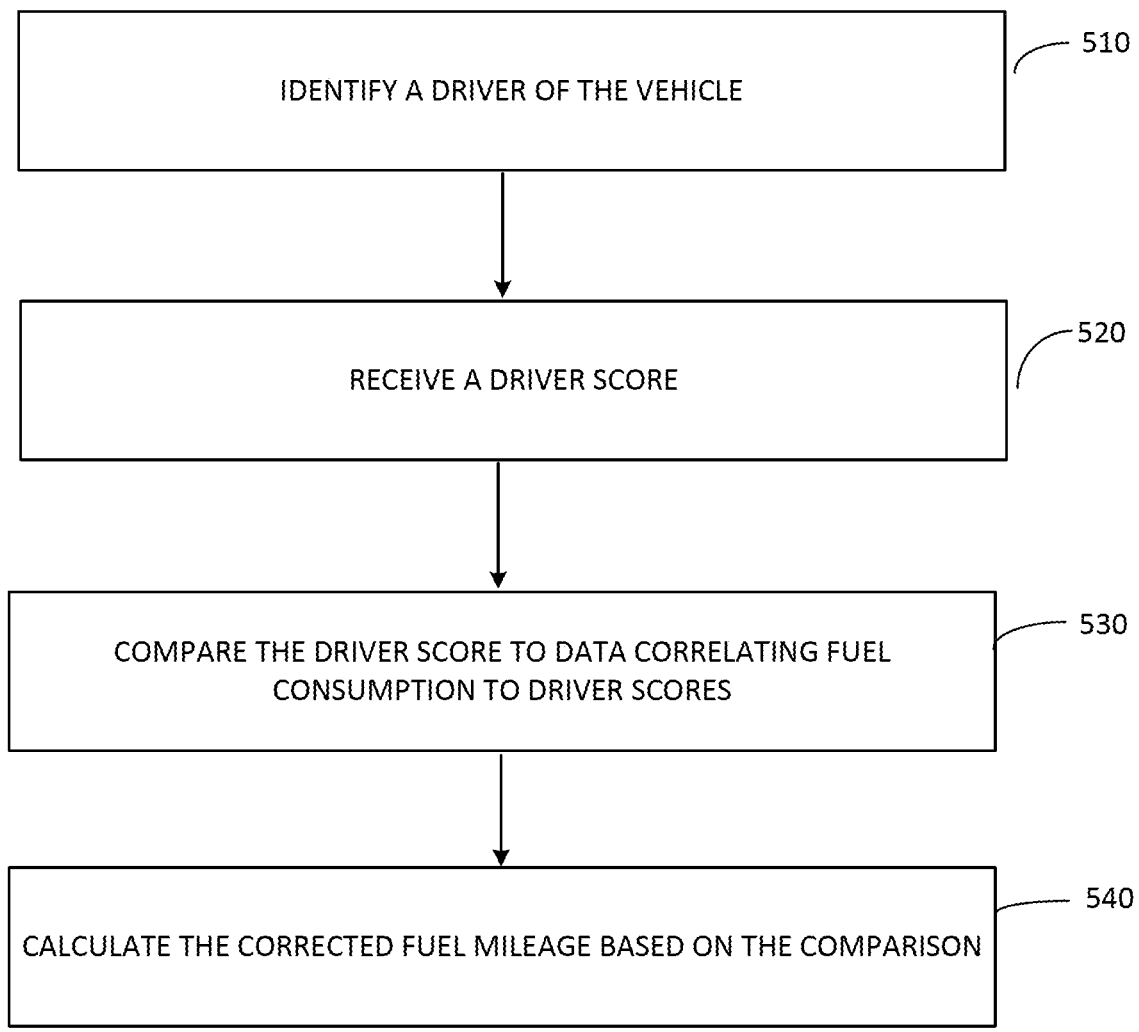
FIG. 5A is an exemplary flowchart illustrating correcting fuel mileage based on a driver score, according to certain embodiments.

FIG. 5A illustrates an aspect of the second embodiment, in which the method continues by identifying a driver (510) of the vehicle based on the driver identification received by the controller from the on-board communication module 112; the controller receiving, from a big data center 380, a driver score (520) correlated to fuel consumption for the identified driver; wherein the driving score is partially based on historical sensor data recording vehicle braking events, vehicle throttling events and abrupt turning events which occurred when the identified driver operated the vehicle as shown at (530). The Fuel Capacity Correction Module 372 is configured for determining a corrected fuel mileage (540) of the vehicle based on the driver score of the identified driver. The processor 370 is configured for comparing the corrected fuel consumption to a fuel mileage of the vehicle and a distance between the vehicle and a vehicle destination; and by using Decision Module 374, sending a notification to the controller 362 to generate, via an output device, a refueling notification for the identified driver based on the comparison.

The method continues by further comprising determining whether the tire pressure sensor data indicates a tire that is relatively low or high; the instructions causing the processor to perform the steps of comparing the fluid pressure of the tire to a threshold fluid pressure; and calculating a correction to the fuel mileage of the vehicle based on the comparison.

Figure 5B:
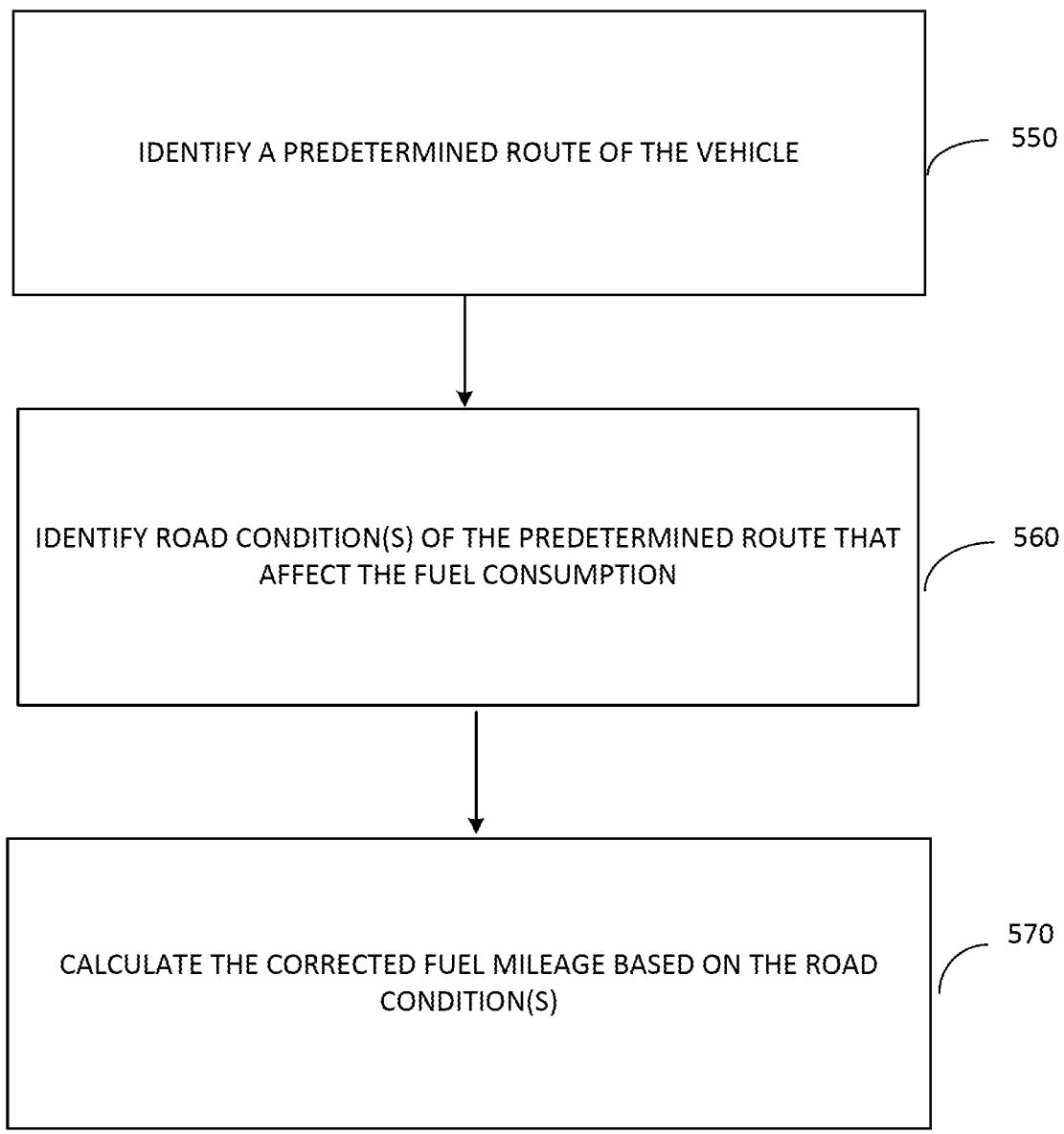
FIG. 5B is an exemplary flowchart illustrating correcting fuel mileage based on road conditions, according to certain embodiments.

FIG. 5B illustrates the method comprising identifying on a portion of a route (550) of the vehicle, a road condition of the route which affects the fuel mileage (560) from the route information (113 and 382) in which a portion of the route which includes an inclined driving surface; the instructions causing the processor to perform the steps of determining a slope and a length of the inclined driving surface, the slope corresponding to a decrease in the fuel consumption of the vehicle; and calculating the corrected fuel consumption (570) based on the slope and the length of the driving surface.

FIG. 1-3 further illustrate a third embodiment to a non-transitory computer readable medium having instructions stored therein that, when executed by one or more processors, causes the one or more processors to perform a method for receiving an identification from a vehicle 102 and comparing the identification to subscriber data in database 364 to authenticate the vehicle based on the comparison; receiving vehicle sensor data from sensors 103 within the first vehicle, the sensors including tire pressure sensors, road condition sensors and fuel level sensors; receiving route information 113 from the first vehicle, the route including at least a destination and a current location.

The third embodiment further includes receiving statistical data from a big data center 380, wherein the data is at least historical data related to operating parameters of similar types of vehicles on the route and driving trends of the driver of the vehicle; receiving GPS data from GPS Datastore 382 related to the route and driving conditions along the route; combining the vehicle sensor 103 data, the route information (113 and 382) and the statistical data 380; correlating, using predictive modelling, vehicle sensor data, the route information and the statistical data to a measured fuel mileage of the vehicle; correcting the measured fuel mileage based on the correlating; determining the distance of the vehicle from a refueling station; determining whether the vehicle has sufficient fuel to reach the refueling station based on the corrected fuel level; and when the vehicle does not have sufficient fuel to reach the refueling station, dispatching a drone to refuel the vehicle, wherein the drone is one of an unmanned aerial vehicle 140 and an autonomous ground vehicle 142.

The third embodiment includes further comprising, when the tire pressure sensor data indicates a tire that is relatively low or high, instructions causing the processor to perform the steps of comparing the fluid pressure of the tire to a threshold fluid pressure; and calculating a correction to the fuel mileage of the vehicle based on the comparison.

Figure 6:
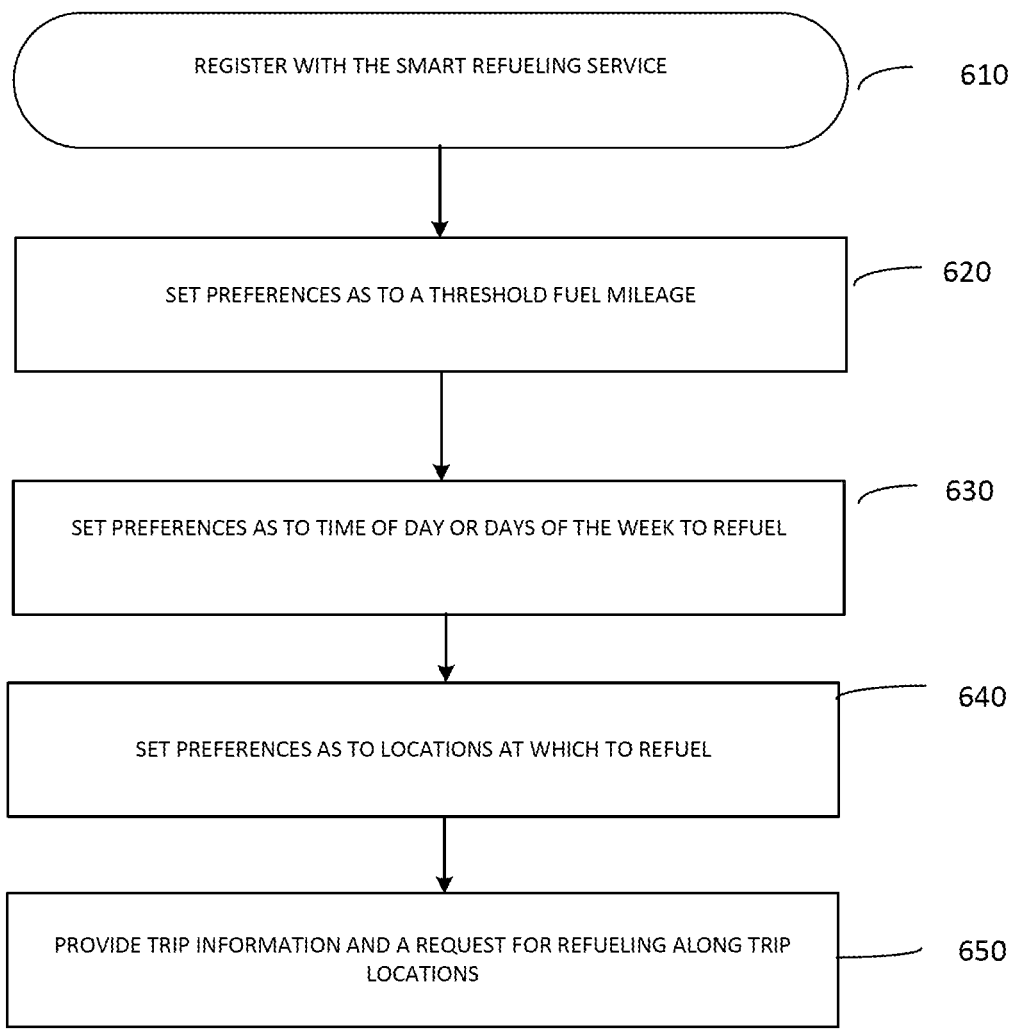
FIG. 6 is an exemplary flowchart depicting registration steps, according to certain embodiments.

The Smart Refueling Service of the first, second and third embodiments may provide a subscription service as shown in FIG. 6. Users may register (610) with the subscription service to receive notices regarding the refueling needs of their vehicle. A user may set a preference as to a lower threshold of fuel mileage (620). A user may schedule the refueling service to autonomously refuel their vehicle at a specific time (630), such as during work hours when the vehicle is parked in a parking lot, or during the night and may indicate preferred locations for refueling (640). A user may notify the Smart Refueling Center of a planned trip and request that a drone meet the vehicle along the route (650) to minimize the time spent refueling. In the case of refueling with a UAV which docks with the vehicle, the user may be able to complete the trip without stopping by using the service.

Figure 7:
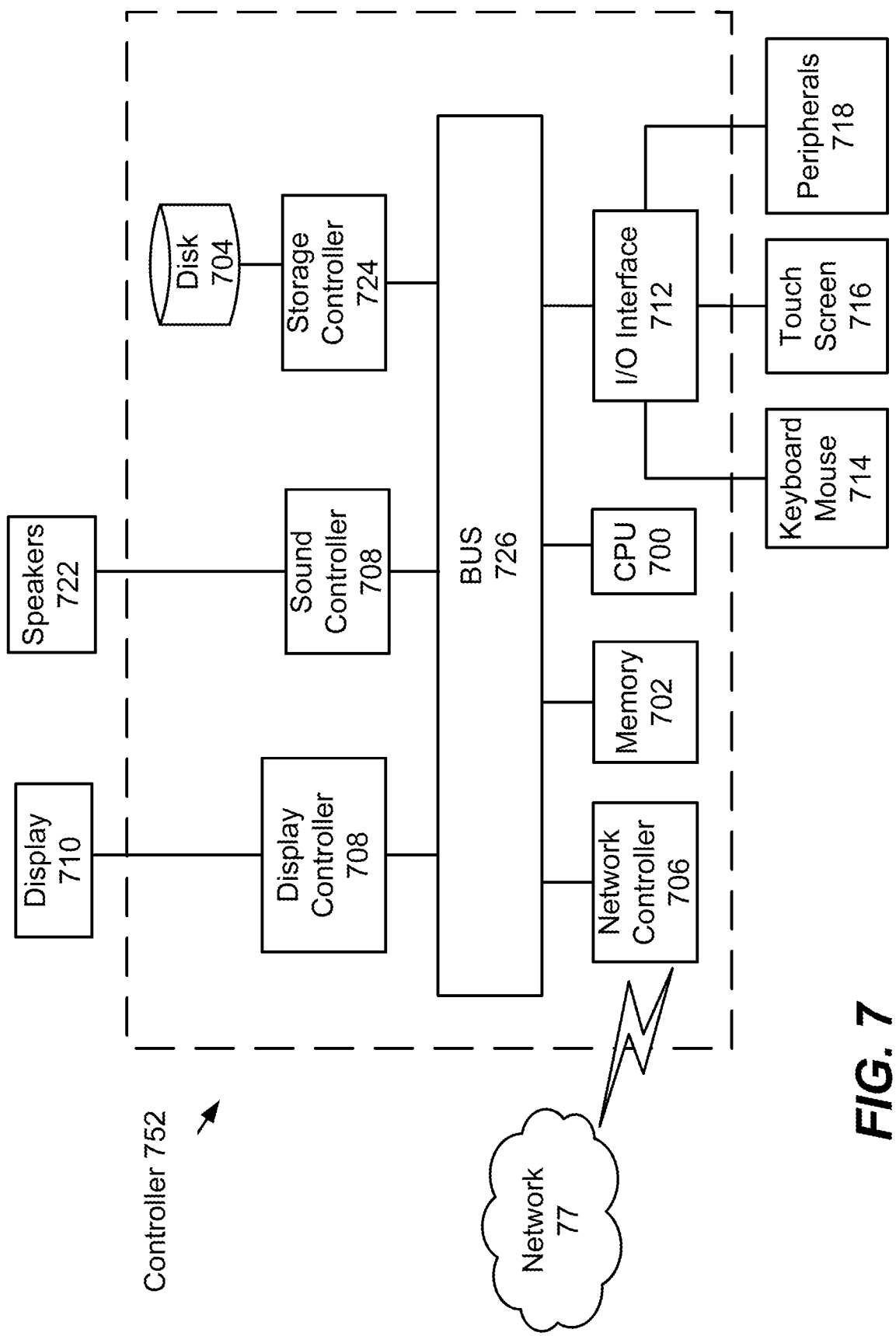
FIG. 7 is an illustration of a non-limiting example of controller circuitry, according to certain embodiments.

Next, a hardware description of the controller 362 according to exemplary embodiments is described with reference to FIG. 7. In FIG. 7, the controller 752 described is representative of the smart fueling controller 362 in which the controller is a computing device which includes a CPU 700 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 700 and an operating system such as Microsoft Windows 7, UNI7, Solaris, LINU7, Apple MAC-OS and other systems known to those skilled in the art.

The hardware elements in order to achieve the computing device may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
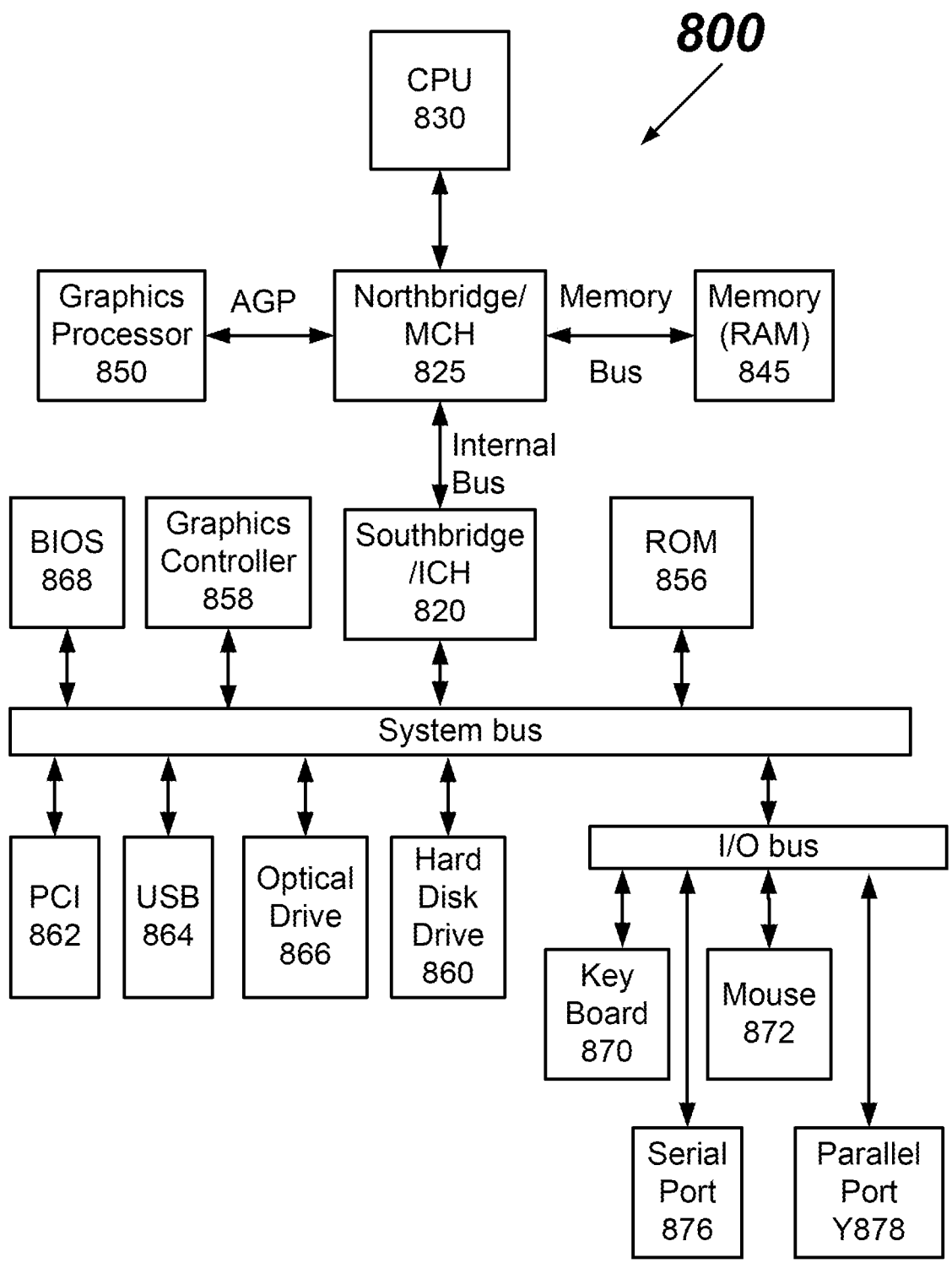
FIG. 8 is an exemplary schematic diagram of a data processing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
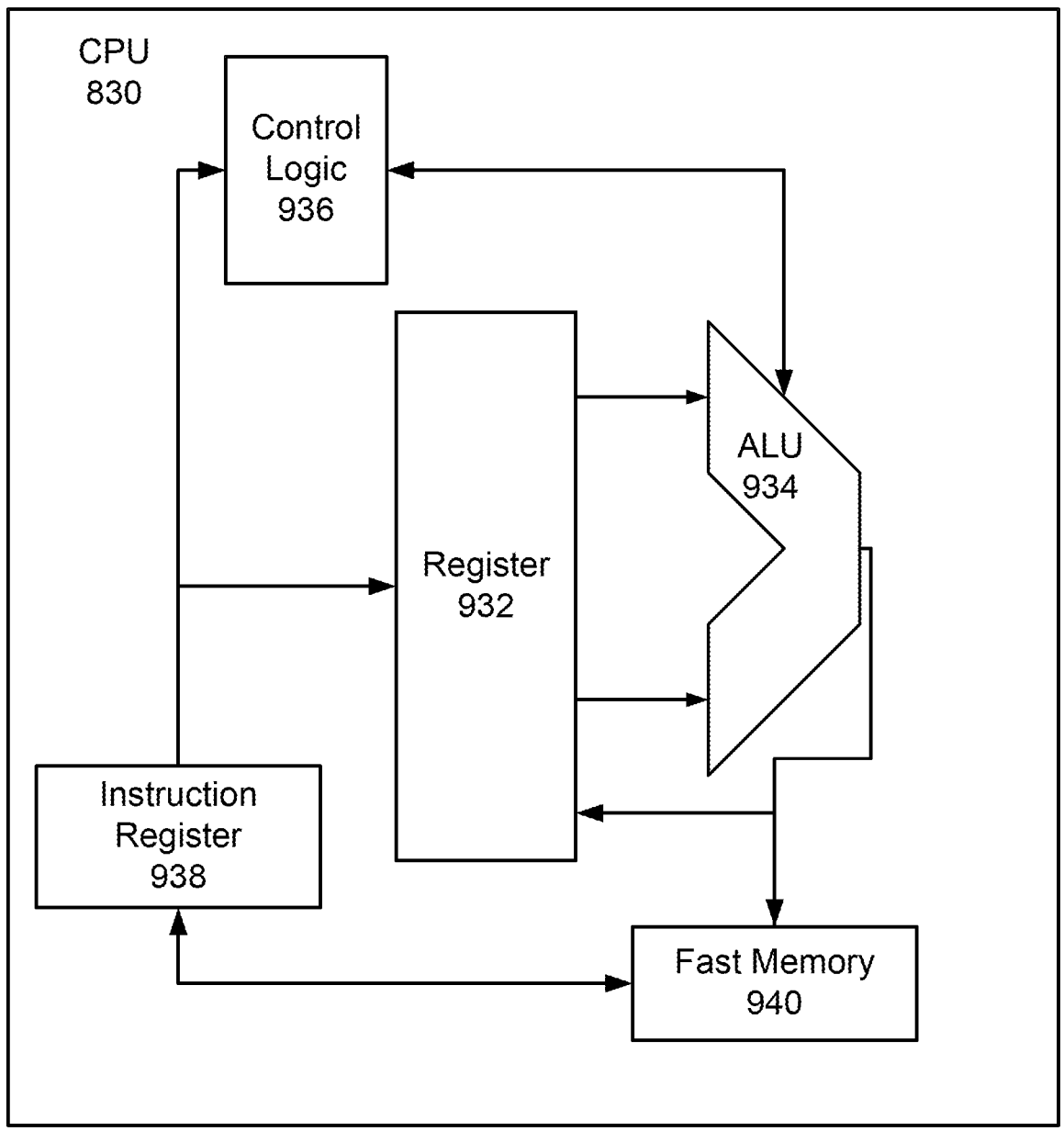
FIG. 9 is an exemplary schematic diagram of a processor, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
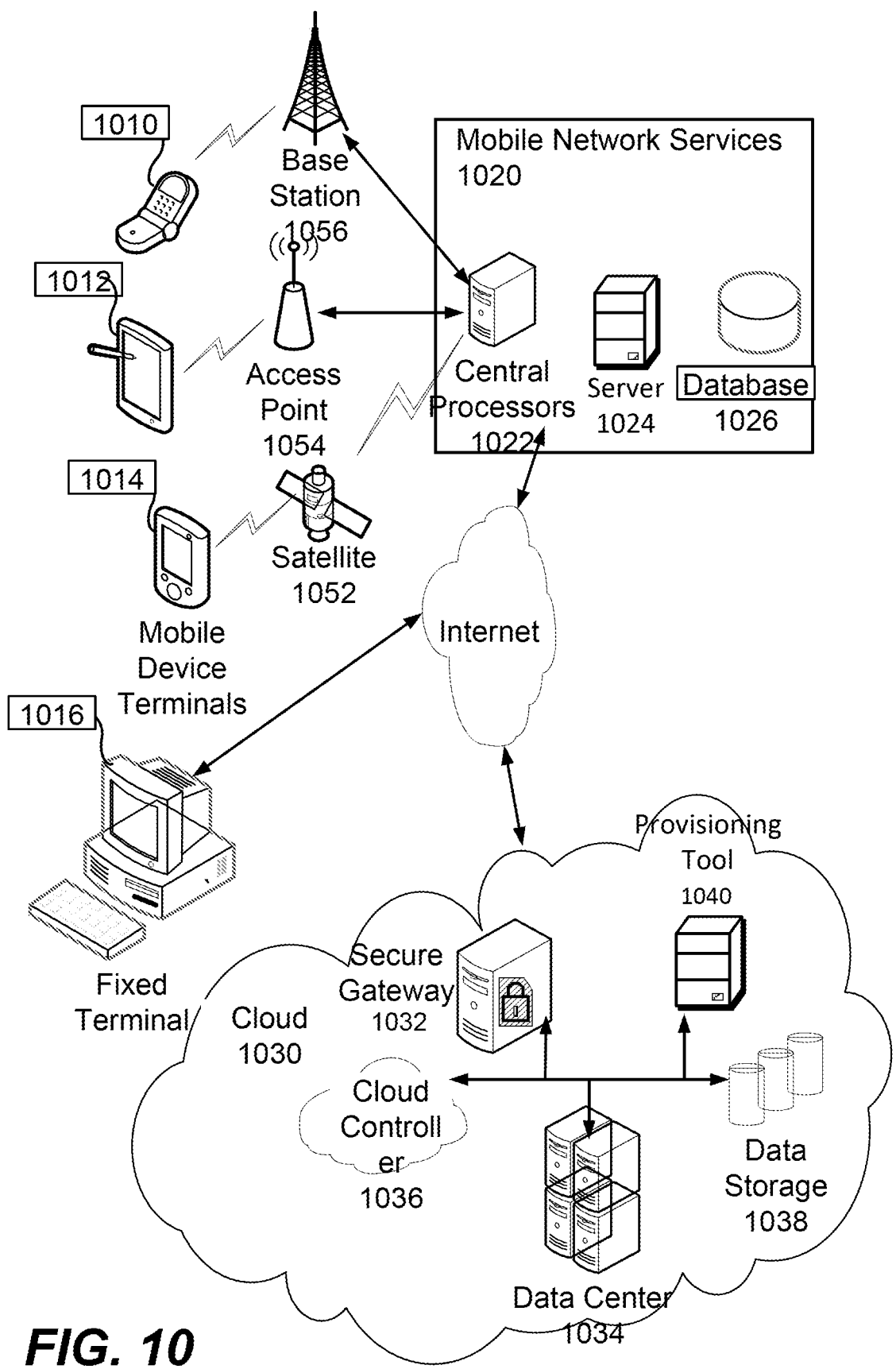
FIG. 10 is an illustration of an exemplary distributed computing environment, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A subscription based smart refueling service, comprising:
a receiver including an antenna;
a GPS unit;
a controller operatively connected to the receiver and the GPS unit;
a processor operatively connected to the controller;
a fuel mileage correction module operatively connected to the processor;
at least one database including a subscriber data record;
at least one memory storing programming instructions;

a decision module having an input and an output, the decision module operatively connected to the processor at its input and operatively connected to the controller at its output;
a drone dispatch module operatively connected to the controller;
wherein the controller includes circuitry and program instructions configured to
receive, by the antenna, an identification from a vehicle having an on-board communication module;
compare, by the processor, the identification to the subscriber data record stored in the at least one database and authenticate the vehicle when the identification matches the subscriber data record;
receive, by the antenna, sensor data from the vehicle, the sensor data including tire pressure data, road condition data, tire wear, accelerometer data, speed data, fuel gauge readings and fuel mileage data;
receive, by the antenna, a driving route from the vehicle, the driving route including at least a destination and a current location;
receive, by the antenna, a driver score of a driver of the vehicle;
receive, by the antenna, historical data related to operating parameters of vehicles of a same model as the vehicle, a first fuel consumption based on the driver score, and a second fuel consumption based on driving trends of the driver of the vehicle;
receive, by the antenna, GPS data related to the driving route;
wherein the processor includes circuitry and program instructions configured to correlate the sensor data, the historical data, the driving trends of the driver and the GPS data related to the driving route to predict a corrected fuel mileage, and compare the corrected fuel mileage with a distance to the destination and a distance to a refueling station;
wherein the decision module includes program instructions configured to
determine whether the vehicle has sufficient fuel to reach the destination based on the corrected fuel mileage;
when the vehicle does not have sufficient fuel to reach the destination, determine whether the vehicle has sufficient fuel to reach the refueling station based on the corrected fuel mileage;
when the vehicle does not have sufficient fuel to reach the refueling station, send a signal to the controller that the vehicle does not have sufficient fuel to reach the refueling station; and
wherein the controller is configured to dispatch instructions to a fleet of drones to instruct a drone to meet the vehicle along the driving route and refuel the vehicle.

2. The subscription based smart refueling service of claim 1, wherein the drone is one of a fleet of unmanned aerial vehicle equipped for transporting fuel, wherein the fuel is one of liquid fuel and battery power.

3. The subscription based smart refueling service of claim 2, wherein
the drone is unmanned aerial vehicle equipped for docking with a docking station on the vehicle;
the drone is configured to receive instructions to meet the vehicle at a designated position along the driving route;
the drone is configured to fly to the designated position; and
the drone is configured to dock on the docking station and refuel the vehicle through the docking station.

4. The subscription based smart refueling service of claim 1, wherein the drone is an unmanned ground vehicle equipped for transporting fuel and refueling a vehicle, wherein the fuel is one of liquid fuel and battery power; and
wherein the drone is configured to receive instructions to drive to a designated position and refuel the vehicle.

5. The subscription based smart refueling service of claim 1,
wherein the identification from the vehicle includes an identity of a driver of the vehicle;
wherein the driving trends associated with the driver include a driver score of the driver of the vehicle; and
wherein the controller further
receives data from a big data center relating fuel consumption to driver scores and determines the corrected fuel consumption of the vehicle based a correlation with the driver score of the driver.

6. The subscription based smart refueling service of claim 5, wherein the driving score of the driver is partially based on historical sensor data recording vehicle braking events, vehicle throttling events and abrupt turning events which occurred when the driver operated the vehicle.

7. The subscription based smart refueling service of claim 1, wherein the operational parameter includes a fluid pressure of a tire that is relatively low or high;
wherein the instructions cause the processor to:
compare the fluid pressure of the tire to a threshold fluid pressure; and
correct the fuel mileage of the vehicle based on the comparison.

8. The subscription based smart refueling service of claim 1, wherein a portion of the driving route includes an inclined driving surface;
wherein the instructions cause the processor to:
determine a slope and a length of the inclined driving surface, the slope corresponding to a decrease in a fuel consumption of the vehicle; and
calculate a corrected fuel mileage based on the slope and the length of the driving surface.

9. A method for refueling a vehicle by a subscription based smart refueling service, comprising:
receiving, by a controller, an identification from a vehicle and comparing the identification to subscriber data to authenticate the vehicle based on the comparison;
receiving, by the controller, vehicle sensor data from sensors within the vehicle, the sensors including tire pressure sensors, tire wear sensors, road condition sensors, accelerometers, speed sensors, fuel gauges and fuel level sensors;
receiving, by the controller, a driving route information from the vehicle, the driving route information including at least a destination and a current location;
receiving, by the controller, statistical data from a big data center, wherein the data is at least historical data related to operating parameters of similar types of vehicles on a driving route and driving trends of a driver of the vehicle;
receiving, by the controller, GPS data related to the route;
combining, by the controller, the controller including circuitry and program instructions stored therein and executed by at least one processor, the vehicle sensor data, the driving route information and the statistical data;
correlating, using predictive modelling, the vehicle sensor data, the driving route information and the statistical data to a measured fuel mileage of the vehicle;

correcting the measured fuel mileage based on the correlating, and generating a corrected fuel mileage;

determining whether the vehicle has enough fuel to reach the destination based on the corrected fuel mileage;

when the vehicle does not have enough fuel to reach the destination, determining a distance of the vehicle from a refueling station;

determining whether the vehicle has sufficient fuel to reach the refueling station based on the corrected fuel mileage; and when the vehicle does not have sufficient fuel to reach the refueling station, dispatching an instruction to a drone to meet the vehicle along the driving route and refuel the vehicle.

10. The method for refueling a vehicle by a subscription based smart refueling service of claim 9, further comprising:

receiving a request to register a vehicle with the subscription based smart refueling service;

providing a private key to the requester;

providing the requester with a set of preferences as to desired times of day or a day of a week to refuel the vehicle, and desired locations at which to refuel the vehicle; and providing the requester with an option to plan a trip including a schedule for refueling at locations along the route.

11. The method for refueling a vehicle by a subscription based smart refueling service of claim 9, wherein the drone is an unmanned aerial vehicle equipped for transporting fuel, wherein the fuel is one of liquid fuel and battery power.

12. The method for refueling a vehicle by a subscription based smart refueling service of claim 9, wherein the driving route information includes a starting location and a starting time, a plurality of intermediate destinations, each intermediate destination including a non-driving time, a final destination and locations of refueling stations along the route;

determining, by the controller, whether the vehicle has sufficient fuel to reach either a first intermediate destination or a refueling station; and when the vehicle does not have sufficient fuel to reach the first intermediate destination or a refueling station, dispatching a drone to refuel the vehicle; and when the vehicle has sufficient fuel to reach the first intermediate destination, determining whether the vehicle has sufficient fuel to reach a second intermediate destination, if the vehicle does not have sufficient fuel to reach the second intermediate destination, dispatching a drone to refuel the vehicle during the non-driving time.

13. The method for refueling a vehicle by a subscription based smart refueling service of claim 9, further comprising:

identifying whether a first driver or a second driver is operating the vehicle, the first driver associated with a first fuel consumption of the vehicle different from a second fuel consumption associated with the second driver;

determining a corrected fuel mileage of the vehicle based on the fuel consumption of the driver identified;

comparing the corrected fuel mileage of the vehicle with a distance between the vehicle and the destination; and when the corrected fuel mileage is less than the distance to the destination, generating, via an output device, a refueling notification for the identified driver based on the comparison.

14. The method for refueling a vehicle by a subscription based smart refueling service of claim 13, wherein the refueling notification includes a refueling request associated with a drone, and if the driver accepts the refueling request, transmitting the refueling request to the drone.

15. The method for refueling a vehicle by a subscription based smart refueling service of claim 13, further including determining, based on a location of the vehicle, one or more refueling locations nearby the vehicle or nearby a portion of the driving route, wherein the refueling notification includes the one or more refueling locations.

16. The method for refueling a vehicle by a subscription based smart refueling service of claim 9, further comprising identifying a driver of the vehicle;

receiving, from a big data center, a driver score correlated to fuel consumption for the identified driver, wherein the driving score is partially based on historical sensor data recording vehicle braking events, vehicle throttling events and abrupt turning events which occurred when the identified driver operated the vehicle;

determining the corrected fuel mileage of the vehicle based on the driver score of the identified driver;

comparing the corrected fuel mileage to a distance between the vehicle and the destination; and generating, via an output device, a refueling notification for the identified driver based on the comparison.

17. The method for refueling a vehicle by a subscription based smart refueling service of claim 9, further comprising:

determining when data from the tire pressure sensor indicates a tire that is relatively low or by comparing a fluid pressure of the tire to a threshold fluid pressure; and calculating a correction to the fuel mileage of the vehicle based on the comparison.

18. The method for refueling a vehicle by a subscription based smart refueling service of claim 9, further comprising identifying from the driving route information a portion of the driving route which includes an inclined driving surface;

performing, by the processor, the steps of determining a slope and a length of the inclined driving surface, the slope corresponding to a decrease in the fuel mileage of the vehicle; and calculating, by the processor, the corrected fuel mileage based on the slope and the length of the driving surface.

19. A non-transitory computer readable medium having instructions stored therein that, when executed by one or more processors, causes the one or more processors to perform a method for a subscription based smart refueling service, comprising:

receiving an identification from a vehicle and comparing the identification to subscriber data to authenticate the vehicle based on the comparison;

receivingnvehicle sensor data from sensors within the vehicle, the sensors including tire pressure sensors, tire wear sensors, road condition sensors, accelerometers, speed sensors, fuel gauges and fuel level sensors;

receiving driving route information from the vehicle, the driving route information including at least a destination and a current location;

receiving statistical data from a big data center, wherein the data is at least historical data related to operating parameters of similar types of vehicles on a driving route and driving trends of a driver of the vehicle;

receiving GPS data related to the driving route;

combining the vehicle sensor data, the driving route information and the statistical data;

correlating, using predictive modelling, the vehicle sensor data, the driving route information and the statistical data to a measured fuel mileage of the vehicle;

determining a corrected fuel mileage based on the correlating;

determining whether the vehicle has enough fuel to reach the destination based on the corrected fuel mileage;

when the vehicle does not have enough fuel to reach the destination, determining whether the vehicle has sufficient fuel to reach a refueling station based on the corrected fuel mileage;

when the vehicle does not have sufficient fuel to reach the refueling station, dispatching a drone to refuel the vehicle, wherein the drone is one of an unmanned aerial vehicle and an autonomous ground vehicle; and directing the drone to refuel the vehicle.

20. The non-transitory computer readable medium of claim 19, further comprising whether data from the tire pressure sensor indicates a tire that is relatively low or high;

the processor performing the steps of comparing a fluid pressure of the tire to a threshold fluid pressure; and calculating a correction to the fuel mileage of the vehicle based on the comparison.

* * * * *